United States Patent
Gholmieh et al.

(10) Patent No.: US 9,025,462 B2
(45) Date of Patent: May 5, 2015

(54) RECEPTION REPORT AGGREGATION

(71) Applicant: QUALCOMM Incorporated, San Diego, CA (US)

(72) Inventors: Ralph Akram Gholmieh, San Diego, CA (US); Nagaraju Naik, San Diego, CA (US); Carlos M.D. Pazos, San Diego, CA (US); Edward R. Hall, Bristol (GB)

(73) Assignee: QUALCOMM Incorporated, San Diego, CA (US)

( * ) Notice: Subject to any disclaimer, the term of this patent is extended or adjusted under 35 U.S.C. 154(b) by 102 days.

(21) Appl. No.: 13/741,258

(22) Filed: Jan. 14, 2013

(65) Prior Publication Data
US 2013/0182628 A1    Jul. 18, 2013

Related U.S. Application Data

(60) Provisional application No. 61/587,121, filed on Jan. 16, 2012.

(51) Int. Cl.
| | |
|---|---|
| H04L 1/16 | (2006.01) |
| H04W 24/02 | (2009.01) |
| H04L 12/18 | (2006.01) |
| H04L 29/06 | (2006.01) |
| H04L 12/58 | (2006.01) |

(Continued)

(52) U.S. Cl.
CPC ............. *H04W 24/02* (2013.01); *H04L 1/1635* (2013.01); *H04L 12/189* (2013.01); *H04W 74/08* (2013.01); *H04L 65/4076* (2013.01); *H04L 1/06* (2013.01); *H04L 1/1671* (2013.01); *H04L 1/1848* (2013.01); *H04L 51/38* (2013.01); *H04L 1/0019* (2013.01); *H04W 4/06* (2013.01)

(58) Field of Classification Search
USPC .................. 370/236, 236.1, 236.2, 312, 390
See application file for complete search history.

(56) References Cited

U.S. PATENT DOCUMENTS

| | | | |
|---|---|---|---|
| 7,936,694 B2 | 5/2011 | Choudhury | |
| 8,175,069 B2 | 5/2012 | Wang et al. | |

(Continued)

FOREIGN PATENT DOCUMENTS

| | | | |
|---|---|---|---|
| WO | 2004040928 A1 | 5/2004 | |
| WO | 2007057036 A1 | 5/2007 | |

OTHER PUBLICATIONS

International Search Report and Written Opinion—PCT/US2013/021584—ISA/EPO—Mar. 13, 2013.

(Continued)

*Primary Examiner* — Hoon J Chung
(74) *Attorney, Agent, or Firm* — Arent Fox LLP

(57) ABSTRACT

A method, an apparatus, and a computer program product for wireless communication are provided. The apparatus receives a first service and determines a potential upload time period including an aggregation time period. The potential upload time period is for uploading a reception report for the first service. The apparatus receives a second service before expiration of the aggregation time period. The apparatus determines whether to generate first reporting information for the received first service and second reporting information for the received second service. The apparatus aggregates the first reporting information and the second reporting information based upon the determination to generate both the first reporting information and the second reporting information.

43 Claims, 14 Drawing Sheets

(51) Int. Cl.
*H04W 4/06* (2009.01)
*H04W 74/08* (2009.01)
*H04L 1/06* (2006.01)
*H04L 1/18* (2006.01)
*H04L 1/00* (2006.01)

(56) References Cited

U.S. PATENT DOCUMENTS

| 8,249,036 | B2 | 8/2012 | Kim | |
|---|---|---|---|---|
| 2006/0133554 | A1* | 6/2006 | Horn | 375/354 |
| 2011/0305183 | A1 | 12/2011 | Hsu et al. | |
| 2012/0214405 | A1 | 8/2012 | Wood et al. | |

OTHER PUBLICATIONS

Qualcomm Incorporated: "Reception Report Aggregation", 3GPP Draft; S4-120656 CR 26.346-0238 REV3 (Release 11), 3rd Generation Partnership Project (3GPP), Mobile Competence Centre; 650, Route Des Lucioles; F-06921 Sophia-Antipolis Cedex; France, No. Erlangen, Germany; 20120521-20120525, May 16, 2012, XP050639389, [retrieved on May 16, 2012].

3GPP: "3rd Generation Partnership Project; Technical Specification Group Services and System Aspects; Multimedia Broadcast/Multicast Service (MBMS); Protocols and codecs (Release 10)", 3GPP Draft; 26346-A20, 3rd Generation Partnership Project (3GPP), Mobile Competence Centre ; 650, Route Des Lucioles ; F-06921 Sophia-Antipolis Cedex ; France, Dec. 14, 2011, XP050577725, [retrieved on Dec. 14, 2011].

3rd Generation Partnership Project; Technical Specification Group Services and System Aspects; Multimedia Broadcast/Multicast Service (MBMS); Protocols and codecs (Release 11), 3GPP Standard; 3GPP TS 26.346, 3rd Generation Partnership Project (3GPP), Mobile Competence Centre; 650, Route Des Lucioles; F-06921 Sophia-Antipolis Cedex ; France, vol. SA WG4, No. V11.2.0, Sep. 13, 2012, pp. 1-158, XP050649333, [retrieved on Sep. 13, 2012].

TSG SA WG4: "Liaison Statement on Reception Acknowledgement for MBMS", 3GPP Draft; S3-040907, 3rd Generation Partnership Project (3GPP), Mobile Competence Centre ; 650, Route Des Lucioles ; F-06921 Sophia-Antipolis Cedex ; France, vol. SA WG3, No. Shenzhen; 20041109, Nov. 9, 2004, XP050276593, [retrieved on Nov. 9, 2004].

* cited by examiner

RECEPTION REPORT AGGREGATION

CROSS-REFERENCE TO RELATED APPLICATION(S)

This application claims the benefit of U.S. Provisional Application Ser. No. 61/587,121, entitled "RECEPTION REPORT AGGREGATION" and filed on Jan. 16, 2012, which is expressly incorporated by reference herein in its entirety.

BACKGROUND

1. Field

The present disclosure relates generally to communication systems, and more particularly, to reception report aggregation.

2. Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lowering costs, improving services, making use of new spectrum, and better integrating with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

In an aspect of the disclosure, a method, a computer program product, and an apparatus are provided. The apparatus receives a first service. The apparatus determines a potential upload time period including an aggregation time period. The apparatus receives a second service before expiration of the aggregation time period. The apparatus determines whether to generate first reporting information for the received first service and second reporting information for the received second service. The apparatus aggregates the first reporting information and the second reporting information based upon the determination to generate both the first reporting information and the second reporting information.

DETAILED DESCRIPTION

Figure 1:
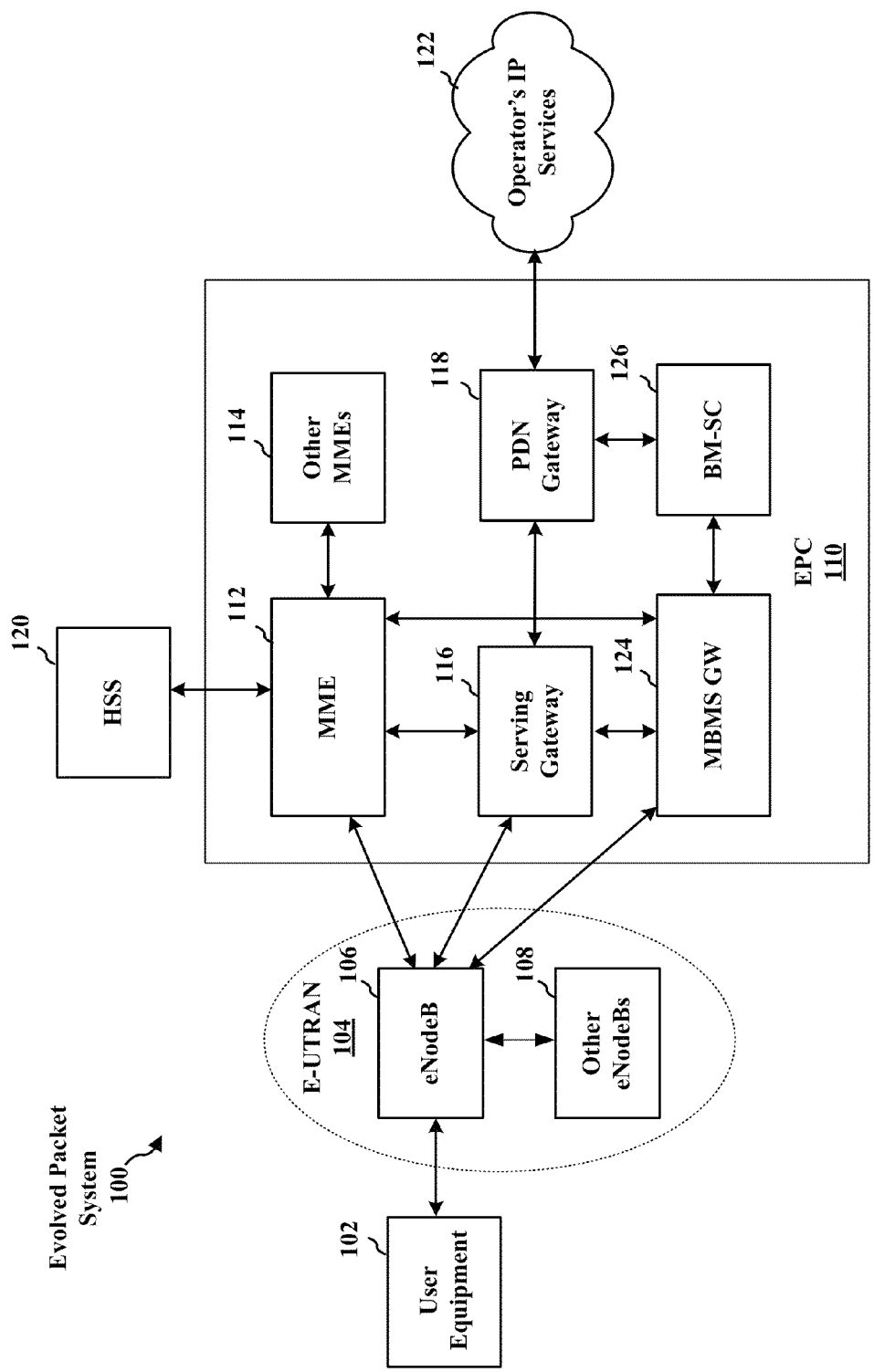
FIG. 1 is a diagram illustrating an example of a network architecture.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, a Home Subscriber Server (HSS) 120, and an Operator's Internet Protocol (IP) Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108. The eNB 106 provides user and control planes protocol terminations toward the UE 102. The eNB 106 may be connected to the other eNBs 108 via a backhaul (e.g., an X2 interface). The eNB 106 may also be referred to as a base station, a Node B, an access point, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected to the EPC 110. The EPC 110 includes a Mobility Management Entity (MME) 112, other MMEs 114, a Serving Gateway 116, a Multimedia Broadcast Multicast Service (MBMS) Gateway 124, a Broadcast Multicast Service Center (BM-SC) 126, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 is connected to the Operator's IP Services 122. The Operator's IP Services 122 may include the Internet, an intranet, an IP Multimedia Subsystem (IMS), and a PS Streaming Service (PSS). The BM-SC 126 may provide functions for MBMS user service provisioning and delivery. The BM-SC 126 may serve as an entry point for content provider MBMS transmission, may be used to authorize and initiate MBMS Bearer Services within a PLMN, and may be used to schedule and deliver MBMS transmissions. The MBMS Gateway 124 may be used to distribute MBMS traffic to the eNBs (e.g., 106, 108) belonging to an MBSFN area broadcasting a particular service, and may be responsible for session management (start/stop) and for collecting eMBMS related charging information.

Figure 2:
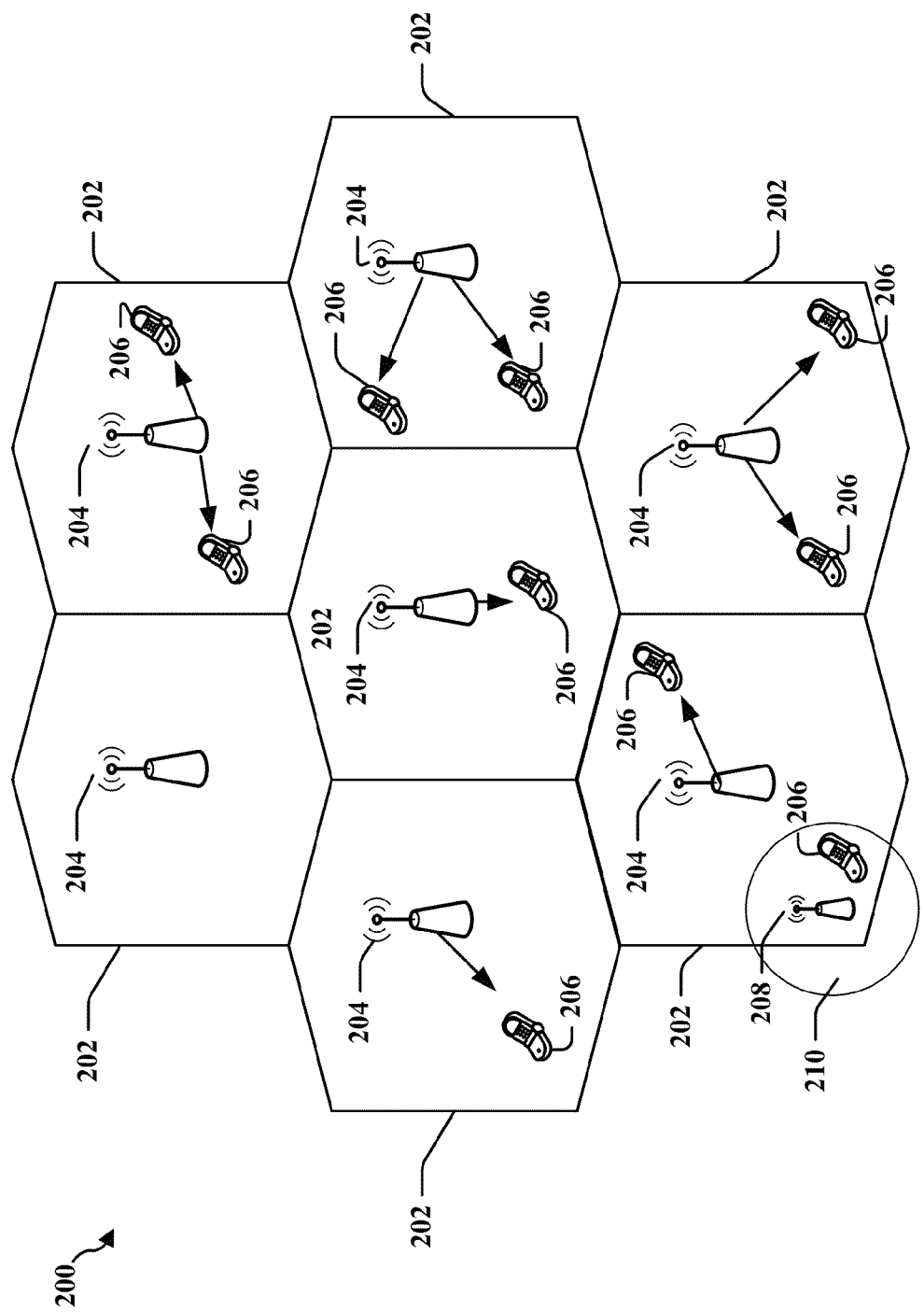
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. The lower power class eNB 208 may be a femto cell (e.g., home eNB (HeNB)), pico cell, micro cell, or remote radio head (RRH). The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116.

The modulation and multiple access scheme employed by the access network 200 may vary depending on the particular telecommunications standard being deployed. In LTE applications, OFDM is used on the DL and SC-FDMA is used on the UL to support both frequency division duplex (FDD) and time division duplex (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDM2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data steams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
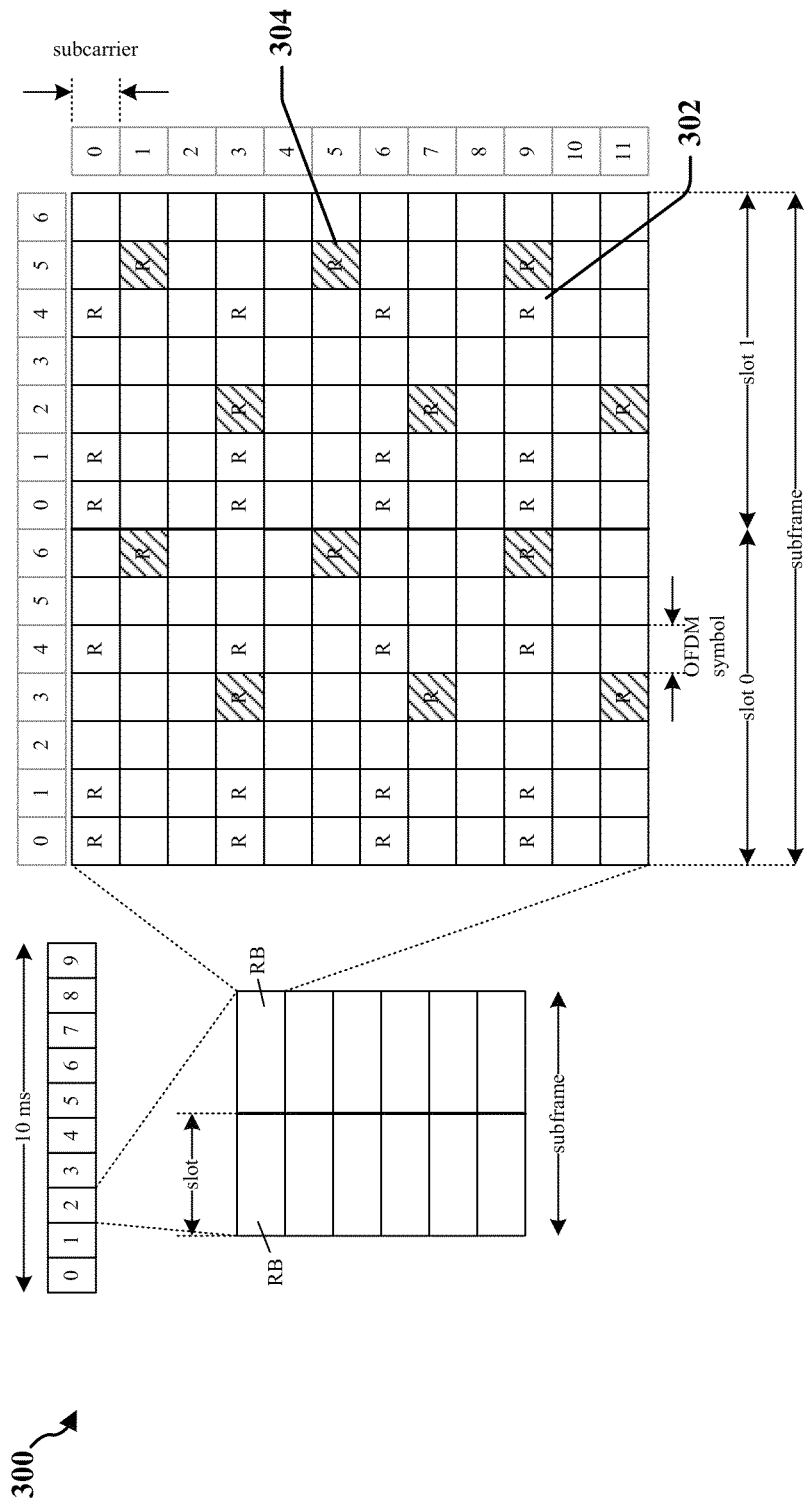
FIG. 3 is a diagram illustrating an example of a DL frame structure in LTE.

FIG. 3 is a diagram 300 illustrating an example of a DL frame structure in LTE. A frame (10 ms) may be divided into 10 equally sized sub-frames. Each sub-frame may include two consecutive time slots. A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. For an extended cyclic prefix, a resource block contains 6 consecutive OFDM symbols in the time domain and has 72 resource elements. Some of the resource elements, as indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted only on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

Figure 4:
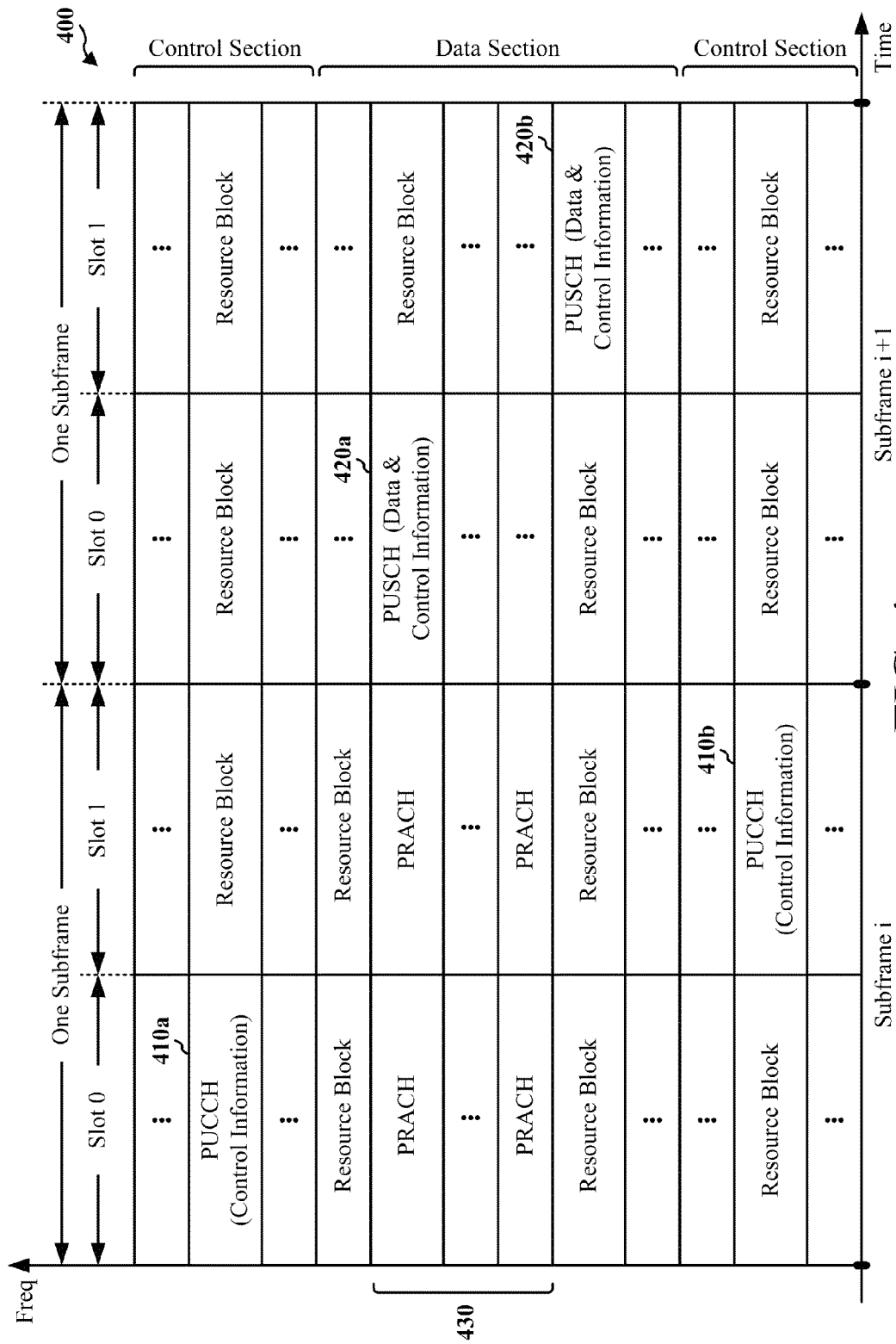
FIG. 4 is a diagram illustrating an example of an UL frame structure in LTE.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
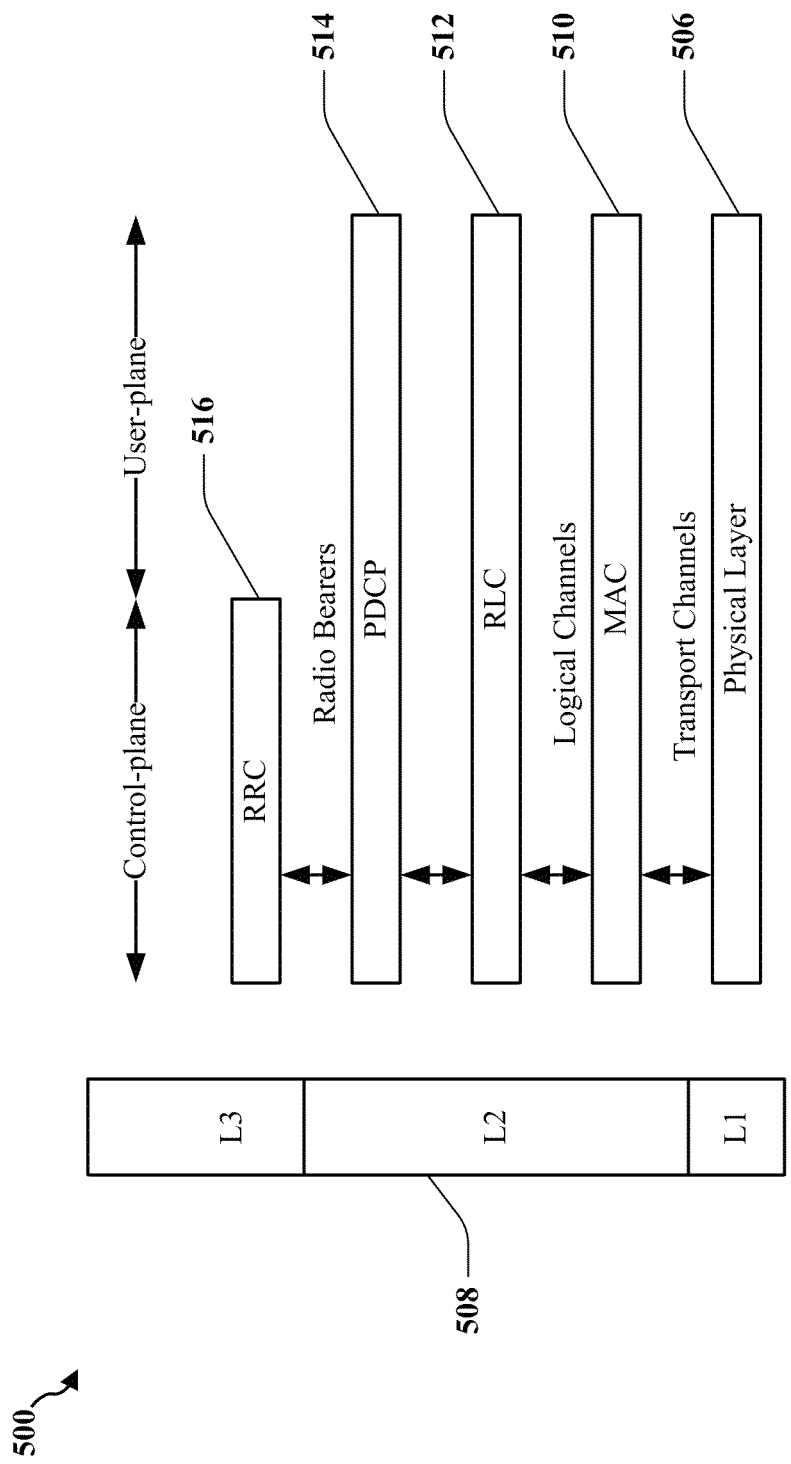
FIG. 5 is a diagram illustrating an example of a radio protocol architecture for the user and control planes.

FIG. 5 is a diagram 500 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (e.g., radio bearers) and for configuring the lower layers using RRC signaling between the eNB and the UE.

Figure 6:
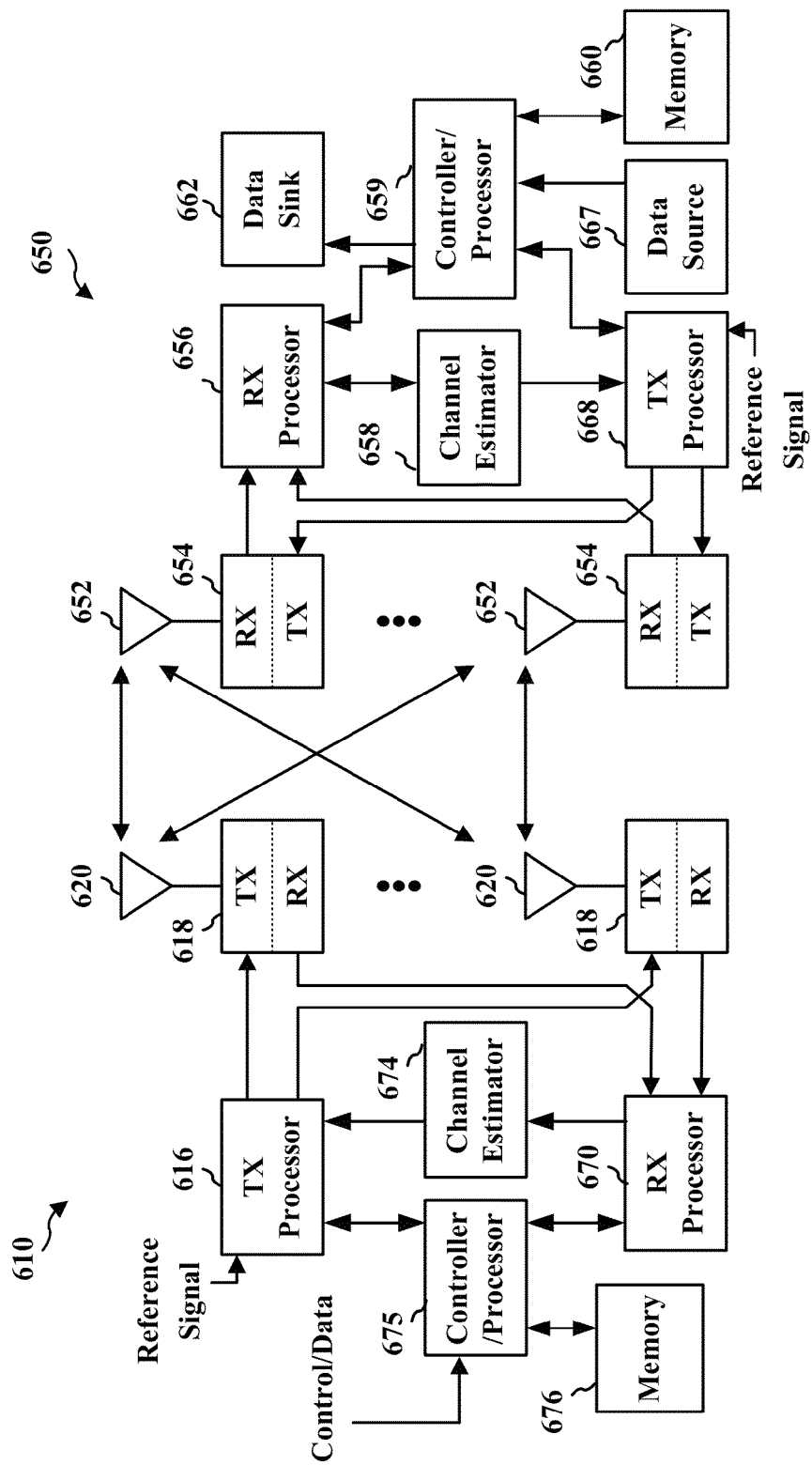
FIG. 6 is a diagram illustrating an example of an evolved Node B and user equipment in an access network.

FIG. 6 is a block diagram of an eNB 610 in communication with a UE 650 in an access network. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The transmit (TX) processor 616 implements various signal processing functions for the L1 layer (i.e., physical layer). The signal processing functions include coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream is then provided to a different antenna 620 via a separate transmitter 618TX. Each transmitter 618TX modulates an RF carrier with a respective spatial stream for transmission.

At the UE 650, each receiver 654RX receives a signal through its respective antenna 652. Each receiver 654RX recovers information modulated onto an RF carrier and provides the information to the receive (RX) processor 656. The RX processor 656 implements various signal processing functions of the L1 layer. The RX processor 656 performs spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 are provided to different antenna 652 via separate transmitters 654TX. Each transmitter 654TX modulates an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the control/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

Figure 7:
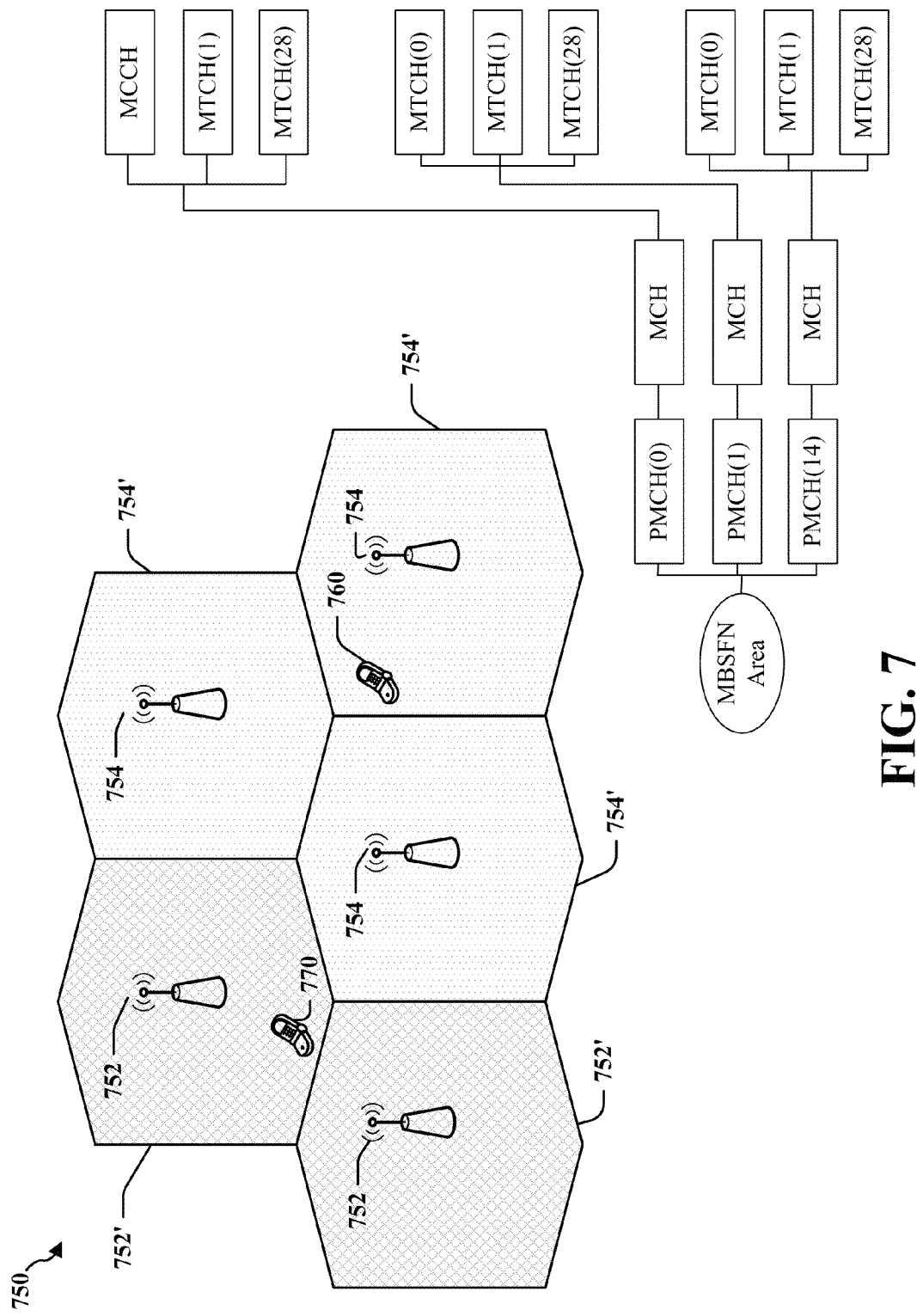
FIG. 7 is a diagram illustrating evolved Multicast Broadcast Multimedia Service in a Multi-Media Broadcast over a Single Frequency Network.

FIG. 7 is a diagram 750 illustrating evolved Multicast Broadcast Multimedia Service (eMBMS) in a Multi-Media Broadcast over a Single Frequency Network (MBSFN). The eNBs 752 in cells 752' may form a first MBSFN area and the eNBs 754 in cells 754' may form a second MBSFN area. The eNBs 752, 754 may be associated with other MBSFN areas, for example, up to a total of eight MBSFN areas. A cell within an MBSFN area may be designated a reserved cell. Reserved cells do not provide multicast/broadcast content, but are time-synchronized to the cells 752', 754' and have restricted power on MBSFN resources in order to limit interference to the MBSFN areas. Each eNB in an MBSFN area synchronously transmits the same eMBMS control information and data. Each area may support broadcast, multicast, and unicast services. A unicast service is a service intended for a specific user, e.g., a voice call. A multicast service is a service that may be received by a group of users, e.g., a subscription video service. A broadcast service is a service that may be received by all users, e.g., a news broadcast. Referring to FIG. 7, the first MBSFN area may support a first eMBMS broadcast service, such as by providing a particular news broadcast to UE 770. The second MBSFN area may support a second eMBMS broadcast service, such as by providing a different news broadcast to UE 760. Each MBSFN area supports a plurality of physical multicast channels (PMCH) (e.g., 15 PMCHs). Each PMCH corresponds to a multicast channel (MCH). Each MCH can multiplex a plurality (e.g., 29) of multicast logical channels. Each MBSFN area may have one multicast control channel (MCCH). As such, one MCH may multiplex one MCCH and a plurality of multicast traffic channels (MTCHs) and the remaining MCHs may multiplex a plurality of MTCHs.

Figure 8:
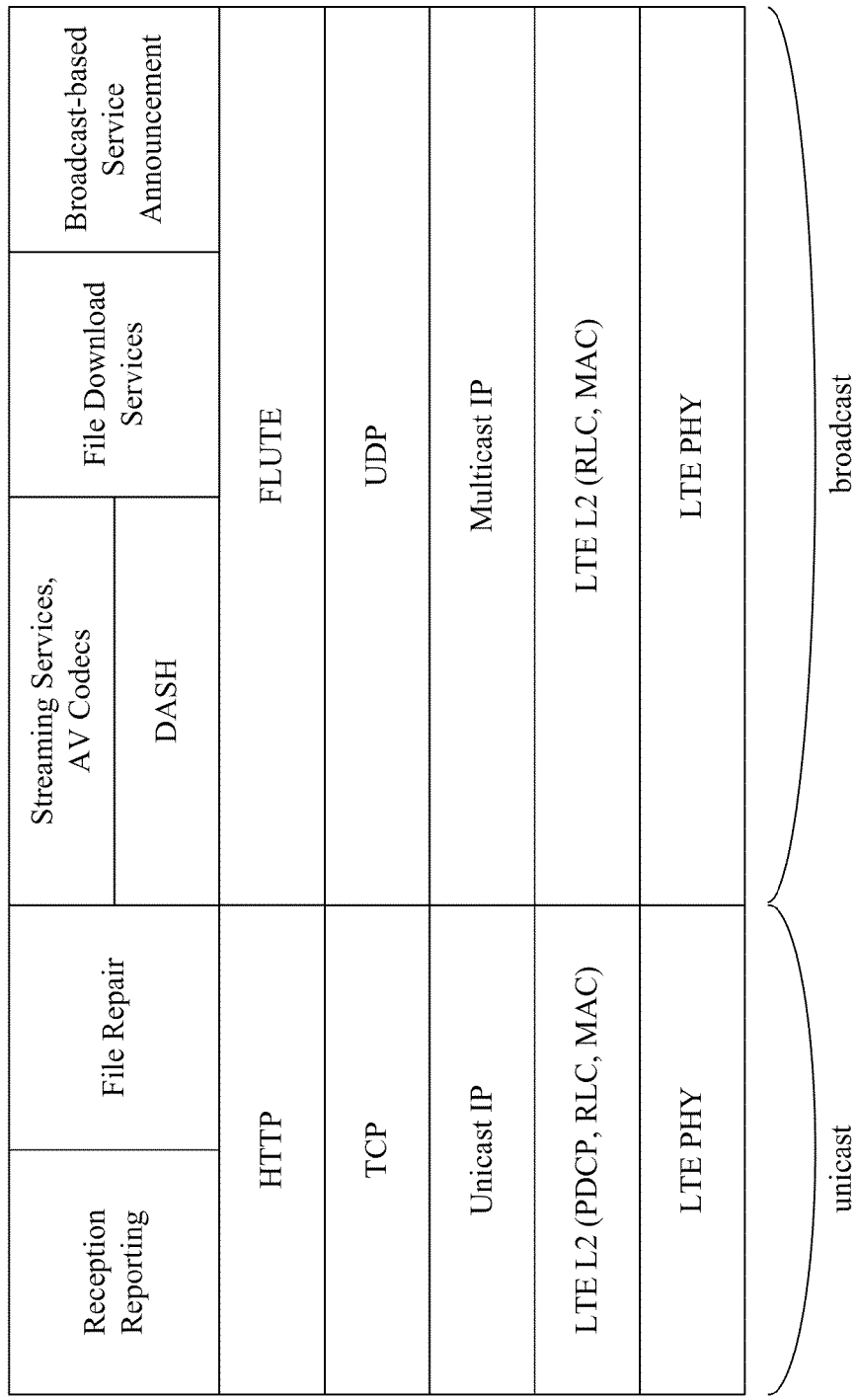
FIG. 8 is a diagram illustrating evolved Multicast Broadcast Multimedia Service protocol layers.

FIG. 8 is a diagram 800 illustrating eMBMS protocol layers. Unicast eMBMS supports reception reporting and file repair through hypertext transfer protocol (HTTP) over unicast transmission control protocol (TCP)/Internet protocol (IP), LTE L2 (packet data convergence protocol (PDCP), radio link control (RLC), medium access control (MAC)), and LTE physical (PHY) protocol layers. Broadcast eMBMS supports streaming services, audio/video (AV) codecs, file download services, and broadcast-based service announcement through File Delivery over Unidirectional Transport (FLUTE), user datagram protocol (UDP), multicast IP, LTE L2 (RLC, MAC), and LTE PHY protocol layers. UEs receive a user service description (USD) containing protocol information for receiving the eMBMS service. The protocol information includes a TMGI, an IP address/UDP port number, AV codec configuration, a FLUTE transport session identifier (TSI), a forward error correction (FEC) configuration, etc. The USD may be received through a procedure called service announcement.

Figure 9:
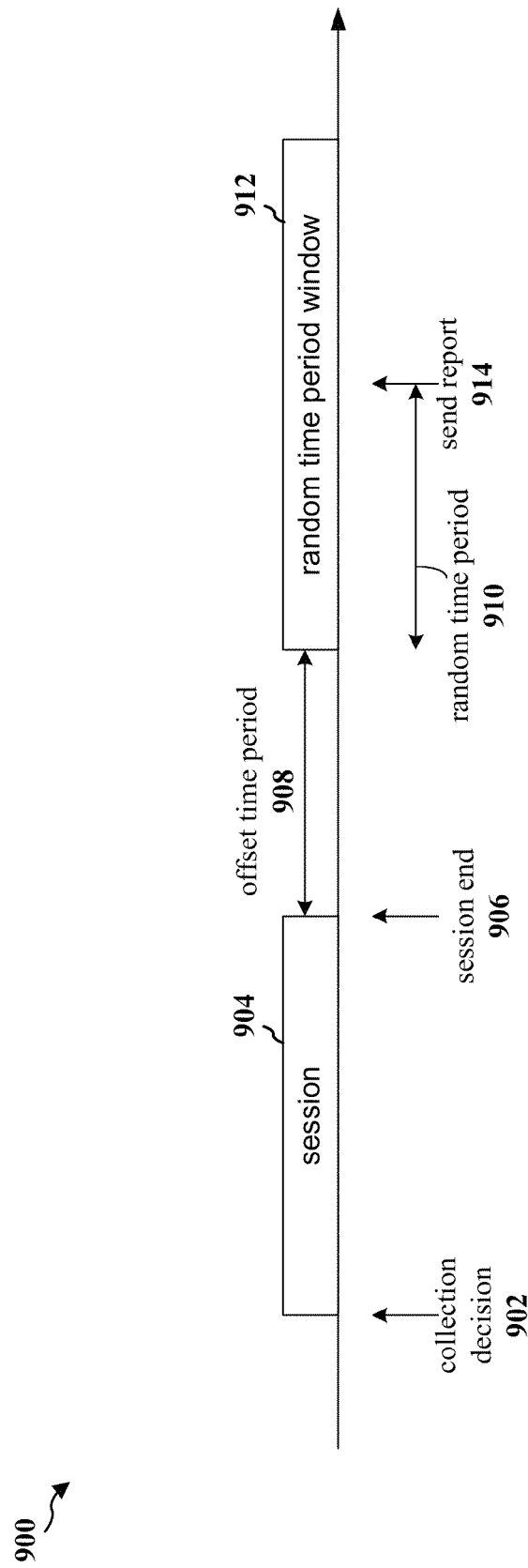
FIG. 9 is a diagram for illustrating a timing relationship for sending a reception report.

FIG. 9 is a diagram 900 for illustrating a timing relationship for sending a reception report. At the start of an eMBMS service session 904, a UE determines whether to send a reception report 902 for the session 904 based on a provided sample percentage for the session. For example, a particular newscast may have a 50% sample percentage. Based on the 50% sample percentage, a UE determines (e.g., using a random number generator) whether to send a reception report for the newscast. Upon determining to send a reception report, a UE sets an offset timer to start at the end of the session 906 and to expire at the end of an offset time period 908 (e.g., 2 hours). The UE waits until expiration of the offset timer and expiration of an additional random time period 910 within a random time period window 912 before sending the reception report 914 for the session 904. In the case of multiple consecutive short viewing sessions, the UE may set multiple timers for sending reception reports. Setting multiple timers for sending reception reports and sending multiple reception reports in separate files can be inefficient. Exemplary methods are provided infra for addressing how multiple reception reports may be handled.

The offset time period (also referred to as offsetTime) and the additional random time period (also referred to as randomTimePeriod) parameters may be set in an Associated Delivery Procedure Description (ADPD) fragment. However, in a more general backoff scheme, a backoff timer may be set to a random variable distributed over [offsetTime, ∞] (i.e., backoff time period). A minimum value on the backoff time period may be desired so that the UE can pick a constant time period less than the offsetTime over which to aggregate reports (the aggregation time period). Alternatively, an aggregation time period can be chosen that is greater than zero and less than or equal to the reception report upload time.

Figure 10:
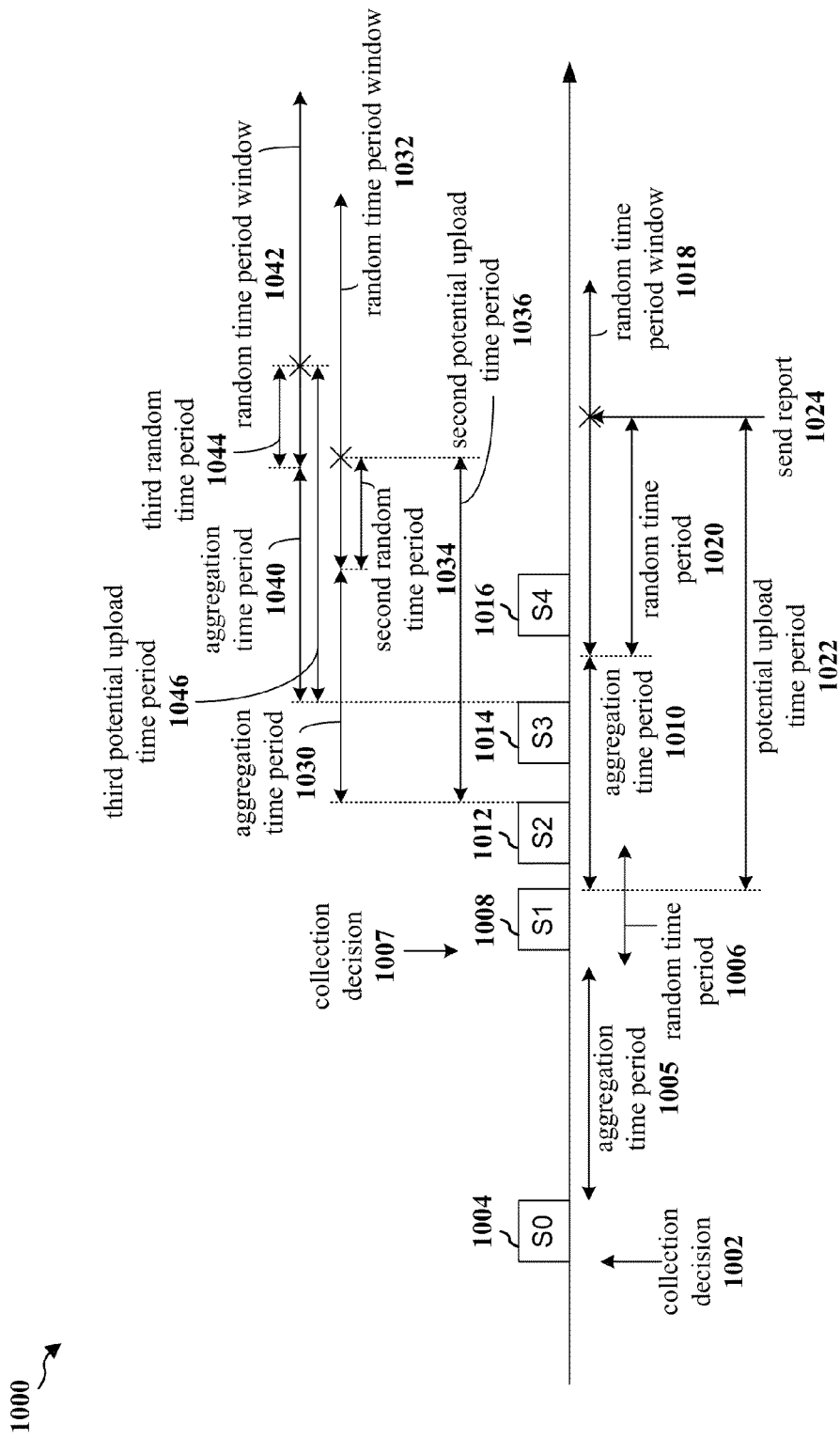
FIG. 10 is a diagram for illustrating exemplary timing relationships for sending reception reports.

FIG. 10 is a diagram 1000 for illustrating exemplary timing relationships for sending reception reports. At the start of an eMBMS service session S0 1004, a UE determines whether to send a reception report 1002 (also referred to as a collection decision herein) for the session S0 1004 based on a provided sample percentage (or random outcome based on the sample percentage) for the session S0 1004. If the UE determines to send a reception report for the session S0 1004, the UE waits an aggregation time period 1005 to receive additional sessions. As shown in FIG. 10, the UE does not receive additional sessions during the aggregation time period 1005. The UE waits an additional random time period 1006 at the end of the aggregation time period 1005 and sends a reception report for the session S0 1004 at the end of the additional random time period 1006. As shown in FIG. 10, the UE receives an eMBMS service session S1 1008. At the start of the session S1 1008, the UE determines whether to send a reception report 1007 for the session S1 1008 based on a provided sample percentage for the session S1 1008. If the UE determines to send a reception report for the session S1 1008, the UE waits an aggregation time period 1010 to receive additional sessions. The UE receives the session S2 1012 and the session S3 1014 during the aggregation time period 1010. Because the session S2 1012 and the session S3 1014 were received during the aggregation time period 1010 for the session S1 1008, the UE determines whether to aggregate reception reports for the session S2 1012 and the session S3 1014 with the reception report for the session S1 1008 into one reception report. Subsequent to the end of the aggregation time period 1010, the UE receives the session S4 1016. Because the session S4 1016 is not received within the aggregation time period 1010, the reception report for the session S4 1016 is not aggregated with the reception report for the session S1 1008.

In the most intuitive implementation described above, the aggregation time period is strictly dependent on the boundaries of session S1. Without any loss of generality, the aggregation time period may be adjusted after the report of a later session is aggregated with the report of the current session. For example, after the decision of aggregating the reports of S1 and S2 at the end of session 2, the aggregation time period may be extended or shortened. The same applies to the upload time period for the aggregated report which can be adjusted based on the reception time of S2. Assume that the UE determines to aggregate the reception reports for the session S1 1008, the session S2 1012, and the session S3 1014 into one reception report. For the session S1 1008, the UE determines a random time period 1020 within a random time period window 1018 to wait subsequent to the end of the aggregation time period 1010. As such, the UE determines a potential upload time period 1022 for uploading the reception report 1024 for the session Si 1008. The potential upload time period 1022 is equal to the aggregation time period 1010 and a random time period 1020. Because the UE has determined to aggregate the reception reports into one file for the session S1 1010 and the session S2 1012, the UE may also determine an aggregation time period 1030 and a second random time period 1034 within a random time period window 1032 for sending a reception report for the session S2 1012. As such, the UE may determine a second potential upload time period 1036 for uploading the reception report for the session S2 1012. Because the UE has determined to aggregate the reception reports into one file for the session S1 1010 and the session S3 1014, the UE may also determine an aggregation time period 1040 and a third random time period 1044 within a random time period window 1042 for sending a reception report for the session S3 1014. As such, the UE may determine a third potential upload time period 1046 for uploading the reception report for the session S3 1014. Upon determining the potential upload time period 1022, the second potential upload time period 1036, and the third potential upload time period 1046, the UE may determine when to send the aggregated reception report 1024. In a first configuration, the UE sends the aggregated reception report 1024 at expiration of the potential upload time period 1022 calculated for S1. In a second configuration, the UE sends the aggregated reception report 1024 at the earliest of the potential upload time periods for all aggregated sessions, which in this case, would be the second potential upload time period 1036. In a third configuration, the UE sends the aggregated reception report 1024 at the latest of the potential upload time periods, which in this case, would be the third potential upload time period 1046. In a fourth configuration, the UE sends the aggregated reception report 1024 at the expiration of an upload time period subsequent to the aggregation time period 1010, and the upload time period is determined as a function of the potential upload time period 1022, the second potential upload time period 1036, and the third potential upload time period 1046 (e.g., the average of the potential upload time periods, the mean of the potential upload time periods, etc.).

The reception reports may be aggregated for one service, for a set of services, or for a set of services that are similarly configured for reception reporting. For example, the reception reports for the session S1 1008, the session S2 1012, and the session S3 1014 may be aggregated only if the sessions are from the same eMBMS service (e.g., the same news broadcast). As such, if the session S1 1008 and the session S3 1014 are the same service, but the session S2 1012 is a different service, the UE may aggregate only the reception reports for the session S1 1008 and the session S3 1014. For another example, the reception reports for the session S1 1008, the session S2 1012, and the session S3 1014 may be aggregated only if the sessions are from the same set of eMBMS services. A set of eMBMS services may be defined to include all services associated with a particular broadcast type (e.g., news, sports, situational comedies). A UE may be explicitly informed whether services belong to the same set of eMBMS services in MBMS service announcements. As such, if the session S1 1008 and the session S2 1012 are news broadcasts, but the session S3 1014 is a sports broadcast, the UE may aggregate only the reception reports for the session S1 1008 and the session S2 1012.

For another example, the reception reports for the session S1 1008, the session S2 1012, and the session S3 1014 may be aggregated only if the sessions are from the same set of eMBMS services that are similarly configured for reception reporting. Services may be considered to be similarly configured for reception reporting when one or more of the reception reporting settings is the same. The reception report settings may be received in an associated delivery procedure description fragment that is associated with a received session. The associated delivery procedure fragment may be received through a service announcement procedure. The reception report settings may include a reporting server, a sample percentage (also known as samplePercentage), and a report type (also known as reportType). The reporting server is the server to which the reception report is uploaded. The sample percentage is the percentage used by the UE to determine whether to send a reception report. The UE can generate a random number between 0 and 100 and compare the random number to a threshold (sample percentage) and collect logs if the random number is less or equal to the sampling percentage. The report type may be one of reception acknowledgement (RAck), statistical reporting for successful reception (StaR), statistical reporting for all content reception (StaR-all), or statistical reporting without reception acknowledgement (StaR-only). For the report type RAck, only successful file reception is reported without reception details. For the report type StaR, successful file reception is reported with reception details for statistical analysis in the network. The report type StaR-all is the same as StaR with the addition that failed reception is also reported. The report type StaR-only is the same as StaR-all with the exception that individual files are not acknowledged. In practice, the reception reporting configuration for these associated services may be described in the same associated delivery procedure fragment. As discussed supra, the reception reporting settings for a service may be described in the associated delivery procedure fragment received through a service announcement. A USD of the eMBMS service announcement may describe one service and point (e.g., through a URL) to an associated delivery procedure fragment. A set of services may have the same reception reporting configuration if their USDs point to the same associated delivery procedure fragment (e.g., identified through a URL).

Another alternative is to signal a reception reporting group ID in the ADPD of every service. Reports are aggregated for services with the same reception reporting group identifier.

When the session S1 1008 and the session S2 1012 are associated together (e.g., the same service, in the same set of services, or in the same set of services with similarly configured reception reporting), the UE may apply to S2 the collection decision made for S1. Similarly, when the session S1 1008 and the session S3 1014 are associated together (e.g., the same service, in the same set of services, or in the same set of services with similarly configured reception reporting), the UE may refrain from determining whether to send a reception report for the session S3 1014 based on the provided sample percentage for the session S1 1008. For example, if the session S1 1008 and the session S2 1012 are associated together and the UE determines to send a reception report for the session S1 1008 based on a sample percentage for the session S1 1008, the UE may automatically decide to send a reception report for session S2 1012, and may therefore determine despite the sample percentage for the session S2 1012 that a reception report will be sent for the session S2 1012. For a specific example, assume that reception reports are being aggregated for sessions S1 and S2. Further assume that the sample percentage for the session S1 1008 is 50% and the sample percentage for the session S2 1012 is 5%. Based on the sample percentage for the session S1 1008 of 50%, the UE determines to send a reception report for the session S1 1008. Because the sessions S1 and S2 1012 are in the same set of services being aggregated, the UE may determine despite the provided sample percentage of 5% that a reception report will be sent for the session S2 1012. Alternatively, the UE may determine not to send a reception report for the session S1 1008. Because the sessions S1 and S2 1012 are in the same set of services being aggregated, the UE may determine independently of the provided sample percentage of 5% that a reception report will not be sent for the session S2 1012. The reason for this linking of both the collection and no-collection decisions is to ensure that the percentage of devices reporting is equal to the desired sampling percentage. For example, carrying forward the decision to collect but not the decision not-to-collect during the aggregation period, would increase the probability of reporting per session beyond the desired samplingPercentage. As discussed supra, a UE may be configured to aggregate reception reports if they are the same service, in the same set of services, or in the same set of services with similarly configured reception reporting. However, if the aggregated file reaches a file size threshold that is either configured on the device or communicated through the service announcement, the UE may refrain from aggregating reception reports for additionally received sessions despite the aggregation setting (e.g., one of aggregating reception reports for sessions when the sessions are the same service, aggregating reception reports for sessions when the sessions are in the same set of services, or aggregating reception reports for sessions when the sessions are in the same set of services and are similarly configured for reception reporting). For example, assume the UE determines to aggregate the reception reports for the session S1 1008, the session S2 1012, and the session S3 1014. If the aggregated reception report file including the receptions reports for the session S1 1008 and the session S2 1012 exceeds a file size threshold, the UE may refrain from aggregating the reception report for the session S3 1014 even though the session S3 1014 was received during the aggregation time period 1010.

Reception reports may be sent in a single TCP session. The reception report may include a uniform resource identifier (URI) of the file for which delivery is being confirmed. Reception reports may be formatted in extensible markup language (XML). Multipart multipurpose Internet mail extensions (MIME) may be used to aggregate a plurality of XML files of reception reports into one reception report file. If the aggregated reception report includes multiple XML files, the aggregated reception report will include a plurality of URIs. The plurality of URIs may be included in the same reception acknowledgement section of the aggregated reception report. For StaR, StaR-all, and StaR-only, the aggregated reception report may include a plurality of statistical report elements, each related to a different service identifier. The statistical report elements include the relevant data for the reception report.

Figure 11:
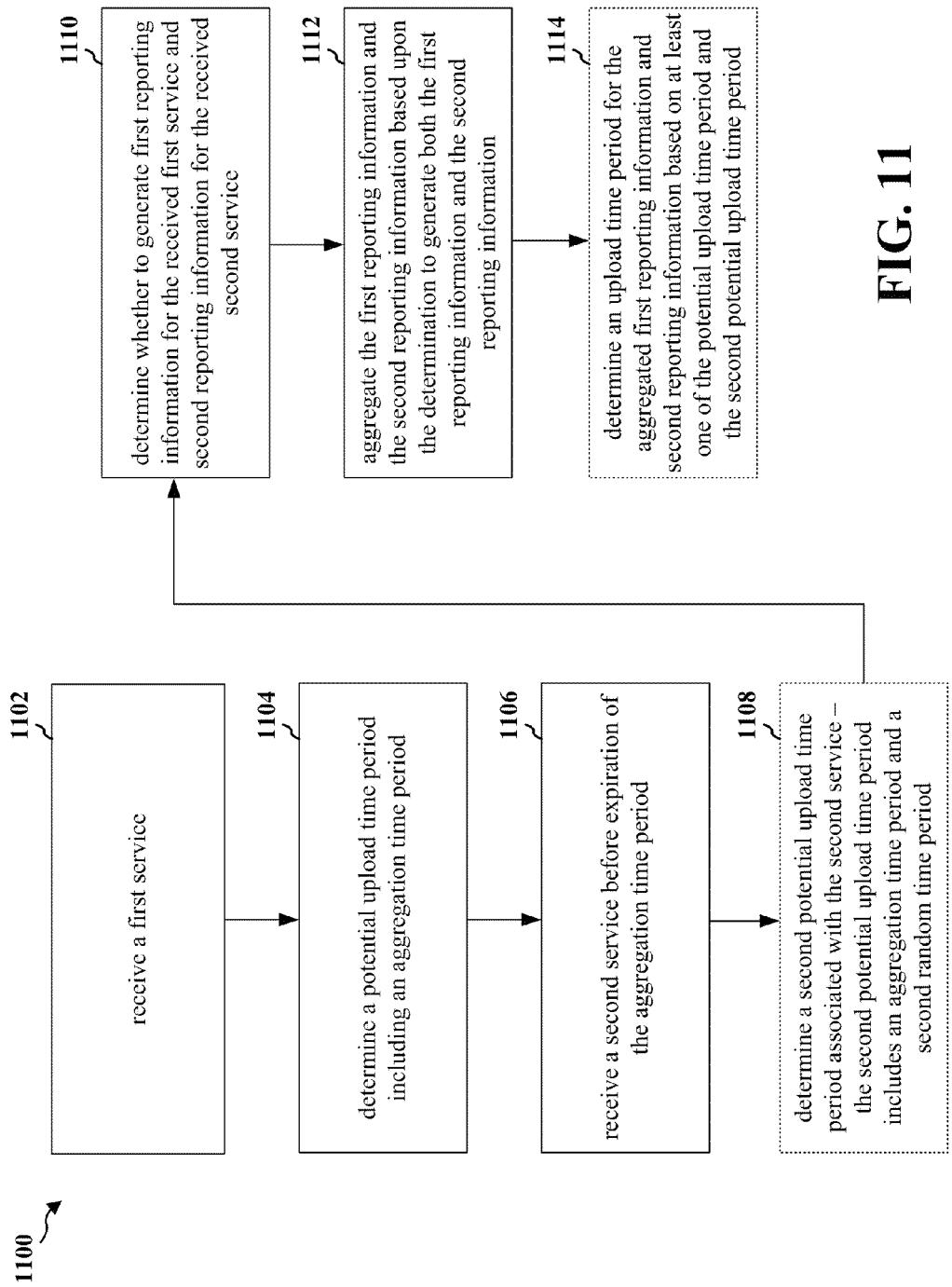
FIG. 11 is a flow chart of a first method of wireless communication.

FIG. 11 is a flow chart 1100 of a first method of wireless communication. The method may be performed by a UE. As shown in FIG. 11, in step 1102, a UE receives a first service. In step 1104, the UE determines a potential upload time period including an aggregation time period. The potential upload time period is for uploading a reception report for the first service. In step 1106, the UE receives a second service before expiration of the aggregation time period. The first service and the second service belong to the set of services for which reception reports are being aggregated. In step 1110, the UE determines whether to generate first reporting information for the received first service and second reporting information for the received second service. In step 1112, the UE aggregates the first reporting information and the second reporting information based upon the determination to generate both the first reporting information and the second reporting information. For example, referring to FIG. 10, a UE receives the eMBMS service session S1 1008. Upon determining to send a reception report for the session S1 1008, the UE determines a potential upload time period 1022 that includes an aggregation time period 1010. The UE receives the eMBMS service session S2 1012 before expiration of the aggregation time period 1010. The UE determines whether to generate first reporting information for the session S1 1008 based on a sample percentage for the session S1 1008 and second reporting information for the eMBMS service session S2 1012 based on whether the session S2 1012 is associated with the session S1 1008 (e.g., the same service, in the same set of services, or in the same set of services with similarly configured reception reporting). The UE aggregates the first reporting information and the second reporting information based upon the determination to generate both the first reporting information and the second reporting information.

The reporting information may be aggregated into one report and the UE may send the one report. The one report may be sent at an end of the potential upload time period. For example, referring to FIG. 10, the UE may send the aggregated reception report 1024 at the end of the potential upload time period 1022. The one report may include a plurality of statistical report elements. The one report may include a plurality of file URIs within a same reception acknowledgement section of the one report. The one report may include a multipart MIME file aggregating the first reporting information and the second reporting information. As discussed supra, the potential upload time period may include the aggregation time period and a random time period. Referring again to FIG. 11, in step 1108, the UE may determine a second potential upload time period associated with the second service. The second potential upload time period includes an aggregation time period and a second random time period. In step 1114, the UE may determine an upload time period for the aggregated first reporting information and second reporting information based on at least one of the potential upload time period and the second potential upload time period. For example, referring to FIG. 10, a UE may determine a second potential upload time period 1036 associated with the service S2 1012. The second potential upload time period 1036 includes an aggregation time period 1030 and a second random time period 1034. The UE may determine an upload time period for the aggregated first reporting information and second reporting information based on at least one of the potential upload time period 1022 and the second potential upload time period 1036.

The determined upload time period may be the potential upload time period. For example, referring to FIG. 10, the UE may set the upload time period to be the potential upload time period 1022 despite having a second potential upload time period 1036 and a third potential upload time period 1046. The first service and the second service may be the same service received at different time periods. The first service and the second service may be eMBMS services. The first service and the second service may be explicitly identified as belonging to a same set of services in the MBMS service announcements. The first service and the second service may share a same associated delivery procedure fragment in respective MBMS service announcements.

Figure 12:
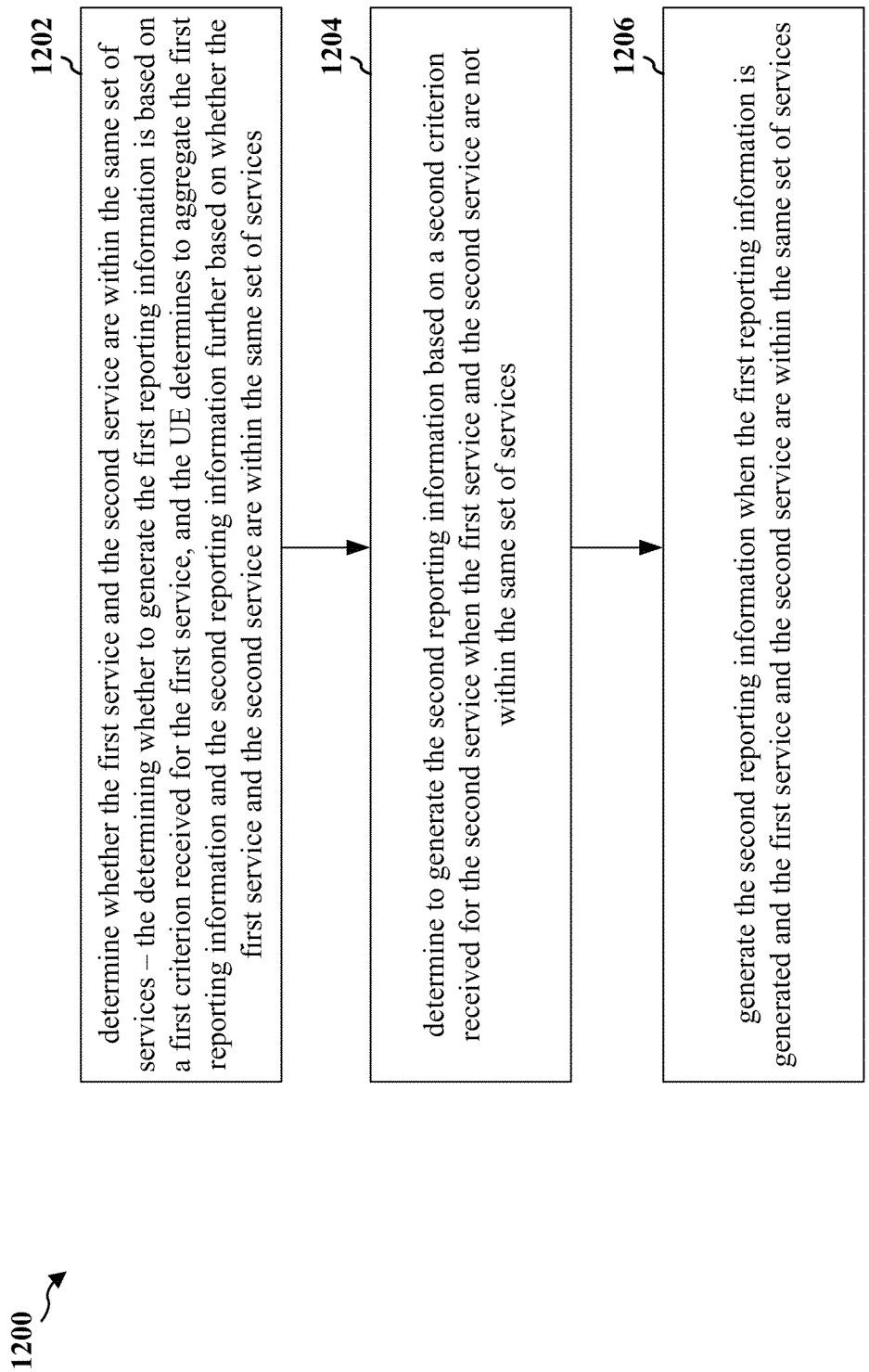
FIG. 12 is a flow chart of a second method of wireless communication.

FIG. 12 is a flow chart 1200 of a second method of wireless communication. FIG. 12 provides additional substeps of step 1110. The method may be performed by a UE. The UE determines whether to generate the first reporting information in step 1110 based on a first criterion received for the first service. The first criterion may be a first sample percentage. Steps 1202, 1204, 1206 are substeps of the step 1110. In step 1202, the UE determines whether the first service and the second service are within the same set of services. The UE may determine whether to aggregate the first reporting information and the second reporting information further based on whether the first service and the second service are within the same set of services. In step 1204, the UE may determine to generate the second reporting information based on a second criterion received for the second service when the first service and the second service are not within the same set of services. The second criterion could be a second sample percentage. In step 1206, the UE may generate the second reporting information when the first reporting information is generated and the first service and the second service are within the same set of services.

Figure 13:
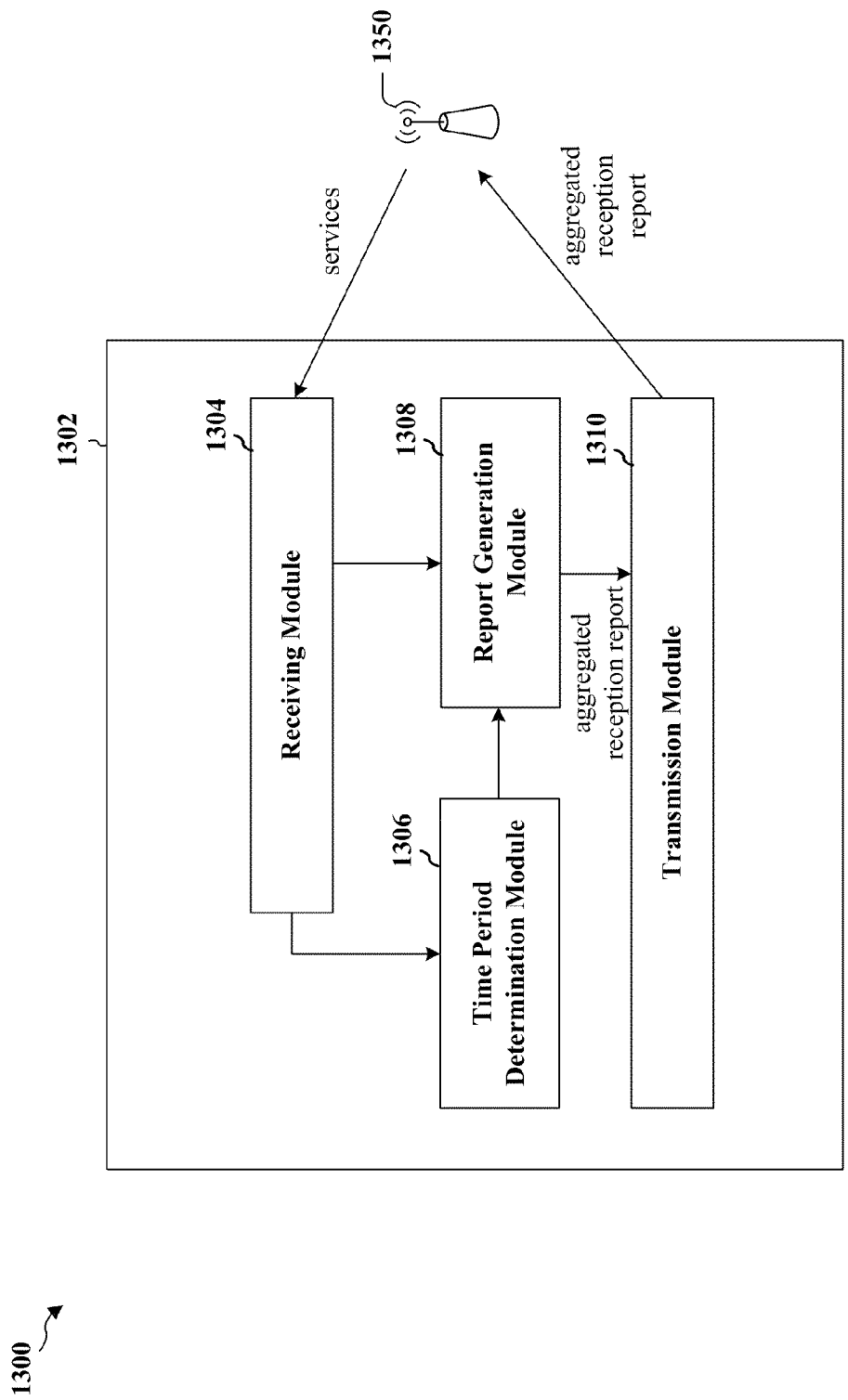
FIG. 13 is a conceptual data flow diagram illustrating the data flow between different modules/means/components in an exemplary apparatus.

FIG. 13 is a conceptual data flow diagram 1300 illustrating the data flow between different modules/means/components in an apparatus 1302. The apparatus may be a UE. The apparatus includes a receiving module 1304 that is configured to receive a first service from the eNB 1350. The apparatus further includes a time period determination module 1306 that is configured to determine a potential upload time period including an aggregation time period. The reception report for the first service is scheduled to be uploaded at the end of the potential upload time period. Services received during the aggregation time period may have their reception reports aggregated together with the reception report for the first service. The receiving module 1304 is further configured to receive a second service before expiration of the aggregation time period. The apparatus further includes a report generation module 1308 that is configured to determine whether to generate first reporting information for the received first service and second reporting information for the received second service. The report generation module 1308 is further configured to aggregate the first reporting information and the second reporting information based upon the determination to generate both the first reporting information and the second reporting information. The apparatus further includes a transmission module 1310 that is configured to send an aggregated reception report.

The time period determination module 1306 may be further configured to determine a second potential upload time period associated with the second service, and to determine an upload time period for the aggregated first reporting information and second reporting information based on at least one of the potential upload time period and the second potential upload time period. The report generation module 1308 may be configured to determine whether to generate the first reporting information based on a first criterion received for the first service. The report generation module 1308 may be further configured to determine whether the first service and the second service are within the same set of services. The report generation module 1308 may determine whether to aggregate the first reporting information and the second reporting information based on whether the first service and the second service being reported are within the same set of services. The report generation module 1308 may be configured to determine to generate the second reporting information based on a second criterion received for the second service when the first service and the second service are not within the same set of services, and to generate the second reporting information when the first reporting information is generated and the first service and the second service are within the same set of services.

Figure 14:
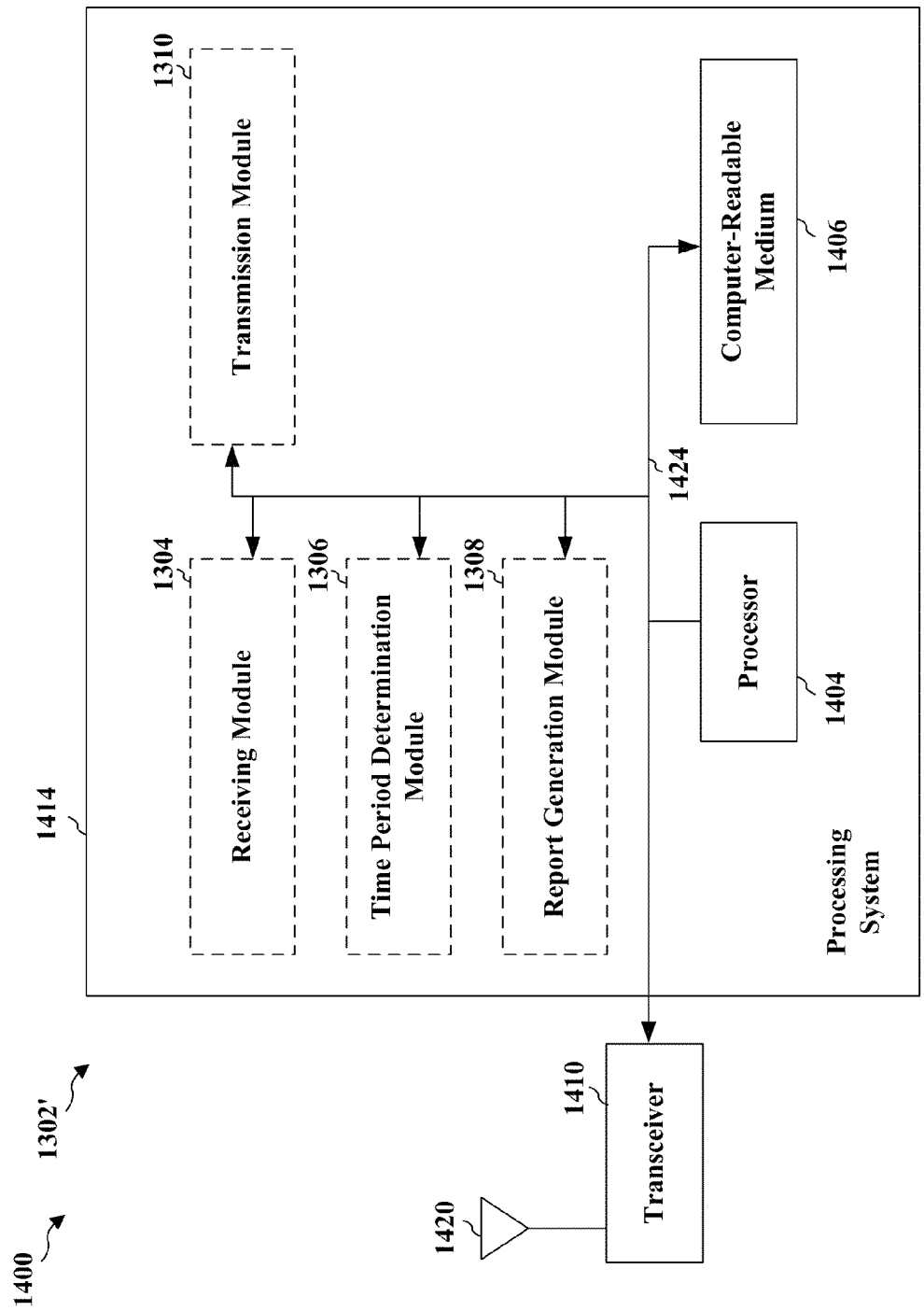
FIG. 14 is a diagram illustrating an example of a hardware implementation for an apparatus employing a processing system.

The apparatus may include additional modules that perform each of the steps of the algorithm in the aforementioned flow charts of FIG. 11 and FIG. 12. As such, each step in the aforementioned flow chart of FIG. 11 and FIG. 12 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof FIG. 14 is a diagram 1400 illustrating an example of a hardware implementation for an apparatus 1302' employing a processing system 1414. The processing system 1414 may be implemented with a bus architecture, represented generally by the bus 1424. The bus 1424 may include any number of interconnecting buses and bridges depending on the specific application of the processing system 1414 and the overall design constraints. The bus 1424 links together various circuits including one or more processors and/or hardware modules, represented by the processor 1404, the modules 1304, 1306, 1308, 1310 and the computer-readable medium 1406. The bus 1424 may also link various other circuits such as timing sources, peripherals, voltage regulators, and power management circuits, which are well known in the art, and therefore, will not be described any further.

The processing system 1414 may be coupled to a transceiver 1410. The transceiver 1410 is coupled to one or more antennas 1420. The transceiver 1410 provides a means for communicating with various other apparatus over a transmission medium. The transceiver 1410 receives a signal from the one or more antennas 1420, extracts information from the received signal, and provides the extracted information to the processing system 1414, specifically the receiving module 1304. In addition, the transceiver 1410 receives information from the processing system 1414, specifically the transmission module 1310, and based on the received information, generates a signal to be applied to the one or more antennas 1420. The processing system 1414 includes a processor 1404 coupled to a computer-readable medium 1406. The processor 1404 is responsible for general processing, including the execution of software stored on the computer-readable medium 1406. The software, when executed by the processor 1404, causes the processing system 1414 to perform the various functions described supra for any particular apparatus. The computer-readable medium 1406 may also be used for storing data that is manipulated by the processor 1404 when executing software. The processing system further includes at least one of the modules 1304, 1306, and 1308. The modules may be software modules running in the processor 1404, resident/stored in the computer readable medium 1406, one or more hardware modules coupled to the processor 1404, or some combination thereof. The processing system 1414 may be a component of the UE 650 and may include the memory 660 and/or at least one of the TX processor 668, the RX processor 656, and the controller/processor 659.

In one configuration, the apparatus 1302/1302' for wireless communication includes means for receiving a first service, means for determining a potential upload time period including an aggregation time period, means for receiving a second service before expiration of the aggregation time period, means for determining whether to generate first reporting information for the received first service and second reporting information for the received second service, and means for aggregating the first reporting information and the second reporting information based upon the determination to generate both the first reporting information and the second reporting information. The reporting information may be aggregated into one report. The apparatus may further include means for sending the one report. The apparatus may further include means for determining a second potential upload time period associated with the second service, and means for determining an upload time period for the aggregated first reporting information and second reporting information based on at least one of the potential upload time period and the second potential upload time period. The means for determining whether to generate the first reporting information may be based on a first criterion received for the first service, and the means for determining whether to generate the first reporting information may be configured to determine whether the first service and the second service are within the same set of services. The means for aggregating the first reporting information and the second reporting information may be further based on the first service and the second service being within the same set of services. The means for determining whether to generate the first reporting information may be further configured to determine to generate the second reporting information based on a second criterion received for the second service when the first service and the second service are not within the same set of services, and to generate the second reporting information when the first reporting information is generated and the first service and the second service are within the same set of services.

The aforementioned means may be one or more of the aforementioned modules of the apparatus 1302 and/or the processing system 1414 of the apparatus 1302' configured to perform the functions recited by the aforementioned means. As described supra, the processing system 1414 may include the TX Processor 668, the RX Processor 656, and the controller/processor 659. As such, in one configuration, the aforementioned means may be the TX Processor 668, the RX Processor 656, and the controller/processor 659 configured to perform the functions recited by the aforementioned means.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted.

The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communication, comprising:
   receiving a first service;
   determining a potential upload time period including an aggregation time period;
   receiving a second service before expiration of the aggregation time period;
   determining whether to generate first reporting information for the received first service and second reporting information for the received second service;
   aggregating the first reporting information and the second reporting information based upon the determination to generate both the first reporting information and the second reporting information;
   determining a second potential upload time period associated with the second service; and
   determining an upload time period for the aggregated first reporting information and second reporting information based on at least one of the potential upload time period and the second potential upload time period, wherein the first service and the second service are a same user service received at different time periods or are two different user services.

2. The method of claim 1, wherein the reporting information is aggregated into one report, and the method further comprises sending the one report.

3. The method of claim 2, wherein the one report is sent at an end of the potential upload time period.

4. The method of claim 2, wherein the one report comprises a plurality of statistical report elements.

5. The method of claim 2, wherein the one report comprises a plurality of file uniform resource identifier (URI) within a same reception acknowledgement section of the one report.

6. The method of claim 2, wherein the one report comprises a multipart Multipurpose Internet Mail Extensions (MIME) file aggregating the first reporting information and the second reporting information.

7. The method of claim 1, wherein the potential upload time period comprises the aggregation time period and a random time period.

8. The method of claim 1, wherein the determined upload time period is the potential upload time period.

9. The method of claim 1, wherein the first service and the second service are a same service received at different time periods.

10. The method of claim 1, wherein the determining whether to generate the first reporting information is based on a first criterion received for the first service, and further comprises:
    determining whether the first service and the second service are within the same set of services, wherein the aggregating the first reporting information and the second reporting information is further based on the first service and the second service being within the same set of services;
    determining to generate the second reporting information based on a second criterion received for the second service when the first service and the second service are not within the same set of services; and
    generating the second reporting information when the first reporting information is generated and the first service and the second service are within the same set of services.

11. The method of claim 10, wherein the first criterion is a first sample percentage and the second criterion is a second sample percentage.

12. The method of claim 1, wherein the first service and the second service comprise Multicast Broadcast Multimedia Service (MBMS) services.

13. The method of claim 12, wherein the first service and the second service share a same associated delivery procedure fragment in respective MBMS service announcements.

14. The method of claim 13, wherein the first service and the second service are explicitly identified as belonging to a same set of services in the MBMS service announcements.

15. An apparatus for wireless communication, comprising:
    means for receiving a first service;
    means for determining a potential upload time period including an aggregation time period;
    means for receiving a second service before expiration of the aggregation time period;
    means for determining whether to generate first reporting information for the received first service and second reporting information for the received second service;
    means for aggregating the first reporting information and the second reporting information based upon the determination to generate both the first reporting information and the second reporting information;

means for determining a second potential upload time period associated with the second service; and means for determining an upload time period for the aggregated first reporting information and second reporting information based on at least one of the potential upload time period and the second potential upload time period, wherein the first service and the second service are a same user service received at different time periods or are two different user services.

16. The apparatus of claim 15, wherein the reporting information is aggregated into one report, and the apparatus further comprises means for sending the one report.

17. The apparatus of claim 16, wherein the one report is sent at an end of the potential upload time period.

18. The apparatus of claim 16, wherein the one report comprises a plurality of statistical report elements.

19. The apparatus of claim 16, wherein the one report comprises a plurality of file uniform resource identifier (URI) within a same reception acknowledgement section of the one report.

20. The apparatus of claim 16, wherein the one report comprises a multipart Multipurpose Internet Mail Extensions (MIME) file aggregating the first reporting information and the second reporting information.

21. The apparatus of claim 15, wherein the potential upload time period comprises the aggregation time period and a random time period.

22. The apparatus of claim 15, wherein the determined upload time period is the potential upload time period.

23. The apparatus of claim 15, wherein the first service and the second service are a same service received at different time periods.

24. The apparatus of claim 15, wherein the means for determining whether to generate the first reporting information is based on a first criterion received for the first service, and the means for determining whether to generate the first reporting information is configured to:

determine whether the first service and the second service are within the same set of services, wherein the means for aggregating the first reporting information and the second reporting information is further based on the first service and the second service being within the same set of services;

determine to generate the second reporting information based on a second criterion received for the second service when the first service and the second service are not within the same set of services; and generate the second reporting information when the first reporting information is generated and the first service and the second service are within the same set of services.

25. The apparatus of claim 24, wherein the first criterion is a first sample percentage and the second criterion is a second sample percentage.

26. The apparatus of claim 15, wherein the first service and the second service comprise Multicast Broadcast Multimedia Service (MBMS) services.

27. The apparatus of claim 26, wherein the first service and the second service share a same associated delivery procedure fragment in respective MBMS service announcements.

28. The apparatus of claim 27, wherein the first service and the second service are explicitly identified as belonging to a same set of services in the MBMS service announcements.

29. An apparatus for wireless communication, comprising:
a memory; and
at least one processor coupled to the memory and configured to:

receive a first service;

determine a potential upload time period including an aggregation time period;

receive a second service before expiration of the aggregation time period;

determine whether to generate first reporting information for the received first service and second reporting information for the received second service;

aggregate the first reporting information and the second reporting information based upon the determination to generate both the first reporting information and the second reporting information;

determine a second potential upload time period associated with the second service; and determine an upload time period for the aggregated first reporting, information and second reporting information based on at least one of the potential upload time period and the second potential upload time period, wherein the first service and the second service are a same user service received at different time periods or are two different user services.

30. The apparatus of claim 29, wherein the reporting information is aggregated into one report, and the apparatus further comprises sending the one report.

31. The apparatus of claim 30, wherein the one report is sent at an end of the potential upload time period.

32. The apparatus of claim 30, wherein the one report comprises a plurality of statistical report elements.

33. The apparatus of claim 30, wherein the one report comprises a plurality of file uniform resource identifier (URI) within a same reception acknowledgement section of the one report.

34. The apparatus of claim 30, wherein the one report comprises a multipart Multipurpose Internet Mail Extensions (MIME) file aggregating the first reporting information and the second reporting information.

35. The apparatus of claim 29, wherein the potential upload time period comprises the aggregation time period and a random time period.

36. The apparatus of claim 29, wherein the determined upload time period is the potential upload time period.

37. The apparatus of claim 29, wherein the first service and the second service are a same service received at different time periods.

38. The apparatus of claim 29, wherein the processing system is configured to determine whether to generate the first reporting information based on a first criterion received for the first service, and is configured to determine whether to generate the first reporting information by:

determining whether the first service and the second service are within the same set of services, wherein the processing system is configured to aggregate the first reporting information and the second reporting information further based on the first service and the second service being within the same set of services;

determining to generate the second reporting information based on a second criterion received for the second service when the first service and the second service are not within the same set of services; and generating the second reporting information when the first reporting information is generated and the first service and the second service are within the same set of services.

39. The apparatus of claim 38, wherein the first criterion is a first sample percentage and the second criterion is a second sample percentage.

40. The apparatus of claim 29, wherein the first service and the second service comprise Multicast Broadcast Multimedia Service (MBMS) services.

41. The apparatus of claim 40, wherein the first service and the second service share a same associated delivery procedure fragment in respective MBMS service announcements.

42. The apparatus of claim 41, wherein the first service and the second service are explicitly identified as belonging to a same set of services in the MBMS service announcements.

43. A computer program product, comprising:
 a non-transitory computer-readable medium comprising code for:
 receiving; a first service;
 determining a potential upload time period including an aggregation time period;
 receiving a second service before expiration. of the aggregation time period;
 determining whether to generate first reporting information for the received first service and second reporting information for the received second service;
 aggregating the first reporting information and the second reporting information based upon the determination to generate both the first reporting information and the second reporting information;
 determining a second potential upload time period associated with the second service; and
 determining an upload time period for the aggregated first reporting information and second reporting information based on at least one of the potential upload time period and the second potential upload time period, wherein the first service and the second service are a same user service received at different time periods or are two different user services.

* * * * *